United States Patent [19]

Dietrich et al.

[11] 4,376,461
[45] Mar. 15, 1983

[54] HEAT-PUMP HEATING UNIT

[75] Inventors: Bernd Dietrich, Heiligenhaus; Wolfgang Kimpenhaus, Mettmann, both of Fed. Rep. of Germany

[73] Assignee: Rheinisch-Westfälisches Elektrizitätswerk Aktiengesellschaft, Essen, Fed. Rep. of Germany

[21] Appl. No.: 204,533

[22] Filed: Nov. 6, 1980

[30] Foreign Application Priority Data

Nov. 8, 1979 [DE] Fed. Rep. of Germany ....... 2945052

[51] Int. Cl.³ .......................... F28F 3/14; F25B 39/04
[52] U.S. Cl. .................................... 165/170; 62/507
[58] Field of Search .............. 165/148, 149, 150, 168, 165/171, 183, 170, 44; 62/506, 507

[56] References Cited

U.S. PATENT DOCUMENTS

| 33,857 | 12/1867 | Sterens | 165/44 |
|---|---|---|---|
| 1,589,412 | 6/1926 | Mitchell | 165/125 |
| 1,718,953 | 7/1929 | Greenwald | 62/507 |
| 1,914,077 | 6/1933 | Cluchey | 165/125 |
| 2,129,473 | 9/1938 | Mojonnier et al. | 165/170 |
| 2,169,054 | 8/1939 | Mojonnier | 165/170 |
| 2,285,225 | 6/1942 | Norris | 165/170 |
| 2,312,767 | 3/1943 | Meyerhoefer | 165/125 |
| 2,529,915 | 11/1950 | Chausson | 165/44 |
| 2,703,702 | 3/1955 | Meinel | 165/170 |
| 3,163,995 | 1/1965 | Maier | 165/44 |
| 3,440,833 | 4/1969 | Fernandes | 62/507 |
| 3,498,080 | 3/1970 | Campbell et al. | 62/507 |
| 4,153,106 | 5/1979 | Sonoda et al. | 165/44 |
| 4,260,015 | 4/1981 | Tamburini | 165/170 |
| 4,308,913 | 1/1982 | Heeren | 165/68 |

FOREIGN PATENT DOCUMENTS 1400102  7/1975  United Kingdom ................ 62/507

*Primary Examiner*—Daniel J. O'Connor
*Attorney, Agent, or Firm*—Karl F. Ross; Herbert Dubno

[57] ABSTRACT

A heat pump for building-interior heating purposes comprises an outdoor heat exchanger with which heat is abstracted from air forced exclusively by wind currents through the heat exchanger. The heat exchanger comprises a spatial array of heat exchange elements forming a grid through which the wind-displacement can pass and around which the air is in contact with the elements, the grid being open in all compass directions to the air flow.

3 Claims, 9 Drawing Figures

HEAT-PUMP HEATING UNIT

FIELD OF THE INVENTION

Our present invention relates to heat-pump heating units and, more particularly, to a heat exchanger for abstracting heat from the atmosphere as part of a heat-pump system.

BACKGROUND OF THE INVENTION

In the use of heat pumps of space heating, e.g. the heating of a dwelling, a heat exchanger is provided in contact with atmospheric air so that heat is abstracted from the air by the heat pump and is distributed in the dwelling unit.

This heat exchanger can have surfaces in contact with wind-blown air, the natural air currents (i.e. the wind) displacing the air in contact with the heat exchange surfaces.

The heat pump is a thermodynamic machine operating with a fluid (heat carrier) circulation between a thermal reservoir at ambient temperature and a thermal sink at a higher temperature. In the case of building heating with such a pump, the thermal reservoir is the ambient atmosphere while the sink is the air or space within the building.

To circulate the heat carrier, electrical energy is used and the amount of heating in the dwelling is greater than the equivalent amount of electrical energy as a result of the abstraction of heat from the exterior and its transfer by the heat-carrying fluid to the interior.

While heat reservoirs of the type utilized in the past have included bodies of water, ground water and even the earth, efforts have also been made to exploit the sensible heat of atmospheric air for this purpose.

The present invention is concerned primarily with abstracting heat, in a heat-pump system, from this atmospheric air.

Conventional heat exchangers or heat transfer devices for the heating of a heat transfer fluid from the sensible heat atmospheric air generally comprise plate-like elements which are built into a roof structure and hence are contacted on one side only by air which may be blown thereover. The air is passed over these surfaces by wind energy and the surfaces can be connected thermodynamically in parallel although in some cases a tandem or series connection is provided.

Experience has shown that heat exchange surfaces of this type are unsatisfactory in many cases, that large areas are required which may not be available for built-in roof heat exchangers, and that connection of numerous heat exchanger surfaces spread throughout a roof structure can be expensive and difficult. These surfaces, moreover, become inefficient at low wind speeds.

OBJECTS OF THE INVENTION

It is the principal object of the present invention to provide an improved heat-pump system whereby the disadvantages of earlier systems are obviated and the heat exchange efficiency between a carrying fluid and the atmospheric air is increased.

Another object of this invention is to provide an improved heat exchanger, e.g. for mounting on a dwelling, with improved efficiency of heat exchange with wind-driven air, especially for use in a heat pump.

SUMMARY OF THE INVENTION

These objects and others which will become apparent hereinafter are attained, in accordance with the invention, in a heat exchanger for a heat pump which can be mounted upon the roof of a building which may at least in part be heated by thermal energy abstracted from the atmosphere and transferred to the interior of the structure by the heat pump, the heat exchanger comprising a multiplicity of generally flat (planar) heat exchange elements in a spaced-apart, stacked, three-dimensional, grid-like arrangement, e.g. as defined by a support means, so that the stack or grid can be traversed by air from any compass direction and advantageously offering the same resistance (if any) to air from any compass direction. The air traversing the grid flows over and under and all around each element, thereby materially increasing the heat exchange efficiency between the wind-blown air and the heat exchange surfaces.

According to the invention, upstream of intake openings of the grid can be formed at any side or combination of sides of the assembly between upstream edges of the heat exchange elements while edges on the opposite side form the downstream edges and the gaps between the elements, exit openings for the through flow of air.

Advantageously, the elements are horizontal, coextensive and planar so that between each pair of elements a relatively uniform flow cross section is defined which is traversed by the wind-blown air, all of these flow cross sections providing essentially the same flow resistance in any wind-flow direction.

Because the heat exchanger of the present invention can be traversed substantially without significant difference by wind-blown air from any compass direction, the heat exchanger of the invention is significantly different from conventional heat exchangers which provide a fixed counterflow movement of the two fluids in heat exchange relationship, thereby always requiring the flow of the fluid from which the heat is abstracted in a given direction. When the latter heat exchangers are applied to roof structures, they must be oriented so that the inlet edges of the heat exchange element are always turned into the prevailing-wind direction.

According to a feature of the invention, the heat exchange elements are flat or slightly domed or curved plates and a number of such plate elements are connected in parallel with respect to the heat-abstraction fluid and are oriented in mutually parallel generally horizontal orientation with free (unobstructed edges extending all around the periphery of the stack and forming inlet edges depending upon the wind direction.

In a preferred embodiment of the invention, the individual plate elements are equidistant from one another.

Similar results can be obtained when the heat exchanger elements are planar arrays of tubes which can be spaced vertically and horizontally in a three-dimensional grid, a grid arrangement in a plurality of parallel horizontal and a plurality of parallel vertical planes.

In plan view, i.e. as seen from above, the heat exchanger can have a round or rectangular outline and if rectangular, is preferably of a square outline.

The flow passages in the plates or the form of the tubes can be of a spiral or meander configuration and it is also possible within the teachings of the present invention to form the tubes as helices with vertical axes and concentric to one another in a plurality of helices of different radius. To increase the heat exchange surface, the tubes can be provided with ribs, fins or other lamella which can be pressed or clamped onto the tubes or formed unitarily thereon.

Flow grates or lattices are provided in aerodynamic applications, e.g. in air ducts, to smooth and direct air streams and to distribute the air velocity uniformly over a flow cross section across which the grid or lattice is provided. Spatial or three-dimensional flow grids comprise a raster, grid or lattice of elements effective over a predetermined volume occupied by the grid.

We are not aware that spatial grids or lattice structures of the type provided in the present invention have ever been used as heat exchangers for heat pumps adapted to permit the uniform flow of air from any compass direction through the structure. Indeed, this configuration has been found to greatly improve the heat pump efficiency in a manner which could hardly be expected from present-day knowledge of heat exchanger characteristics.

It appears that this efficiency is independent of the wind direction and may result from the ability of the spatial grid to maintain isotropic turbulence throughout the grid and in all of the flow passages defined thereby so that flow conditions are homogeneous and heat transfer is effective throughout the three-dimensional grid under optimum conditions.

It is also surprising that the heat exchanger of the present invention is highly efficient even at low wind speeds, presumably because of the ability at low wind speeds to utilize the latent energy content of the air in addition to its sensible heat. Latent energy results from the transfer of heat on condensation of moisture upon the surfaces of the heat exchanger.

The horizontal orientation of the plates thus not only promotes effective contact with wind-blown air on upper and lower surfaces of all the plates, but also provides these surfaces in an orientation which promotes condensation and reduces the tendency of droplets to be shed by the plates, thereby further increasing the heat exchange area.

Obviously the heat exchanger of the present invention must be exposed to wind-blown air. Best results have been obtained when the heat exchanger is built onto or into the roof of the structure to be heated and a pedestal may be provided to form a horizontal surface upon a coping or inclined roof as may be required. The heat exchanger can also be built as a tower-like structure. Since the natural wind is used to drive the air through the heat exchanger, we are able to completely eliminate the cost of a blower or fan for this purpose, the maintenance problems involved in the use of a fan or blower and the noise which such a device generates.

A deicing or condensate removal device or conduit is also not necessary. In a specific example, the average cooling of air over a flow cross section of 1 m² perpendicular to the flow direction in the winter season can be only 1° K. with an average wind speed of 3.5 m/sec (a common average speed in Germany) which results in a recovery of sensible energy of 20,000 kWh. During the same period solar radiation upon surface inclined at 45° and turned toward the south and of corresponding area is 250 kWh. The sensible heat potential of wind-blown air is thus 80 times greater than the solar energy potential.

The system of the invention is some 60 times more effective in obtaining energy from air than machines which are driven by the kinetic energy thereof, i.e. propellers, windmills and the like. It is, therefore, all the more surprising that this excellent source of energy can be conveniently tapped by a heat pump without any energy cost for the movement of the air through the heat exchanger.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 4:
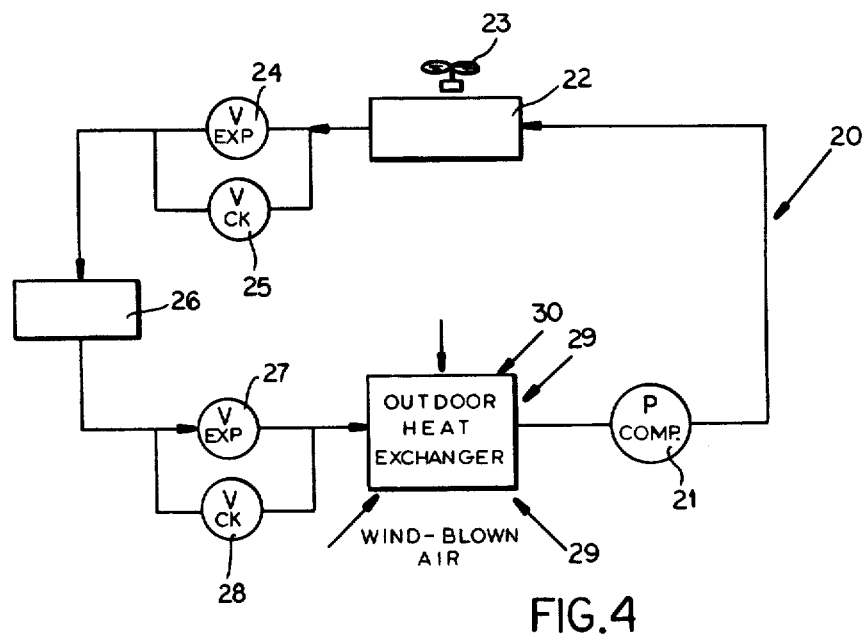
FIG. 4 is a diagram illustrating principles of the present invention.

Referring first to FIG. 4, it can be seen that a heat pump 20 can comprise a compressor 21 which compresses a refrigerant or other heat carrier and feeds the same to a heat exchanger 22 in which, with the air of a blower 23, room air is warmed and space heating is provided.

The cooled refrigerant, after heating the room air, passes in the usual manner through an expansion valve 24 which can be bridged by a check valve 25 to the reservoir 26.

The fluid delivered to the compressor 21 is drawn through the flow passages of an outdoor exchanger in accordance with the present invention after having been expanded in the expansion valve 27 which is bridged by the check valve 28.

The outdoor heat exchanger represented at 30 may correspond to the heat exchangers described in connection with FIGS. 1 and 3 and can be mounted on the roof so that wind-blown air from practically any compass direction as represented by arrows 29 can flow horizontally through the outdoor heat exchanger. The heat of the air is picked up by the refrigerant and transferred to the room in the manner described.

Figure 5:
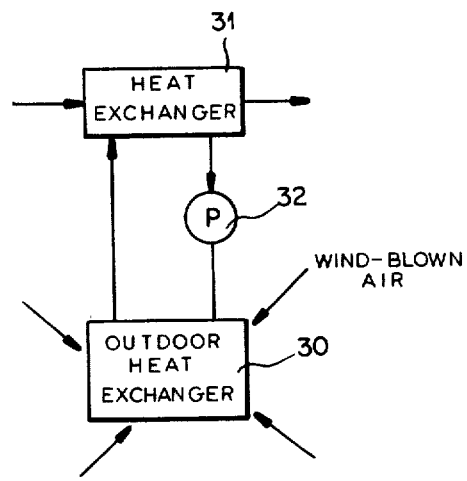
FIG. 5 is a portion of a flow diagram showing an alternative to the system of FIG. 4.

In place of the indirect heat exchange of the refrigerant with the air in the heat exchanger 30, the heat exchanger 30 is replaced by a liquid/liquid indirect heat exchanger 31 (FIG. 5) and an intermediate heat transfer fluid is circulated between the heat exchanger 30 and heat exchanger 31 via the pump 32 in the embodiment of FIG. 5.

Figure 1:
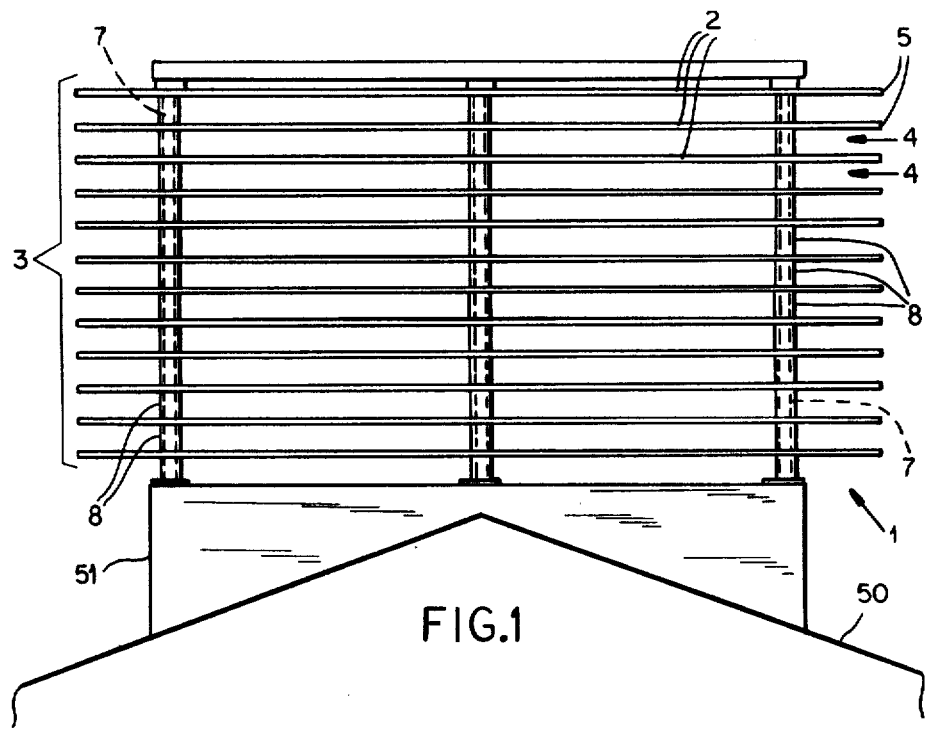
FIG. 1 is a diagrammatic view of a heat exchanger for a heat pump in accordance with the present invention mounted upon a roof.
Figure 3:
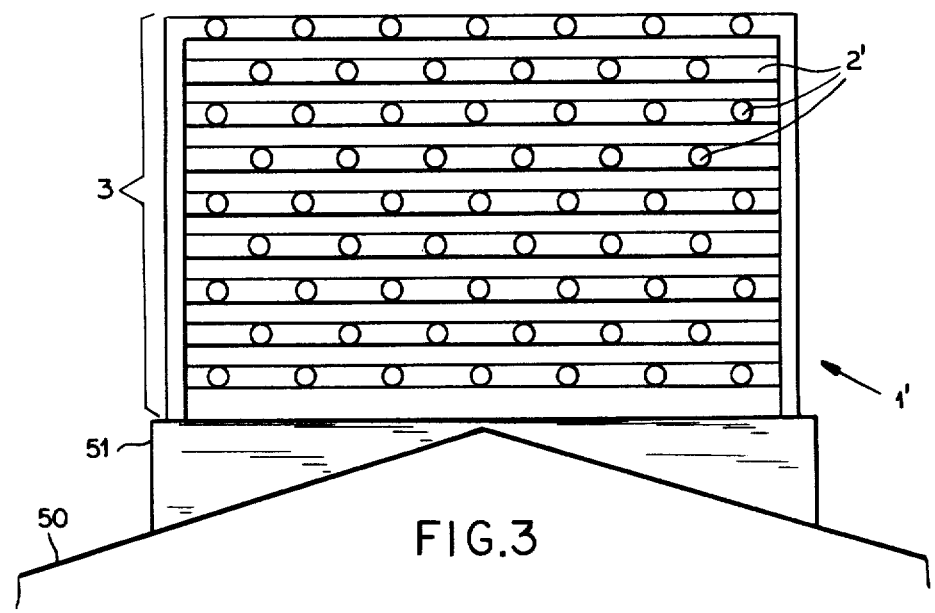
FIG. 3 is an elevational view similar to FIG. 1 but illustrating another embodiment of the invention.

The outdoor heat exchanger which can be used at 30 in the heat pumps of FIGS. 4 and 5 are represented at 1 and 1' in FIGS. 1 and 3, respectively. These heat exchangers comprise a multiplicity of heat exchanger elements 2 which are traversed by the heat carrier, i.e. either the refrigerant in the heat pump of FIG. 4 or the intermediate transfer liquid of the heat pump of FIG. 5.

The individual heat exchanger elements 2 are connected thermodynamically in parallel or in cascade.

The heat exchange elements 2 are assembled in a spatial flow grid of three-dimensional construction so that the individual heat exchange elements of each flow grid 3 can be individually blown over and under by the wind-blown air. The flow grid 3 is uniformly open in all compass directions so that any side may form inlets 4. The flow grid 3 has substantially the same flow resistance for air from any compass direction and provides the same heat exchange cross section for air from any compass direction. In the best mode embodiment of the invention, the flow grid has a square plan configuration as can be seen in FIG. 2 and the height is at least equal to half the length and width thereof.

Figure 2:
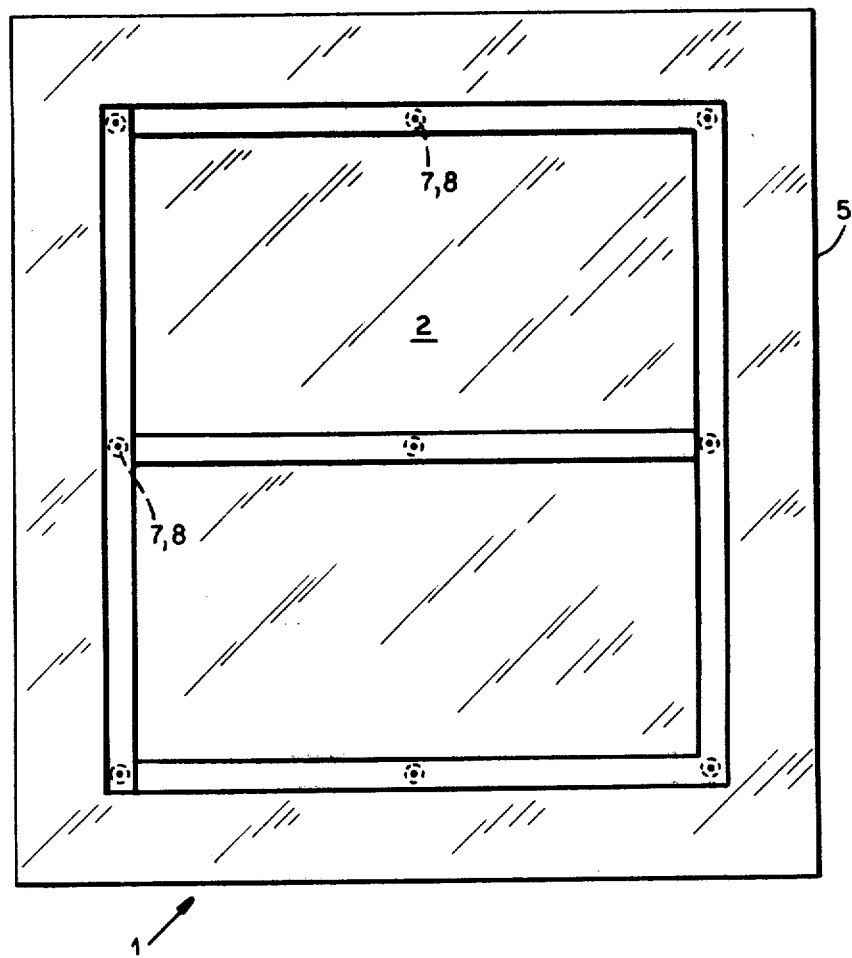
FIG. 2 is a plan view of this heat exchanger.
Figure 6:
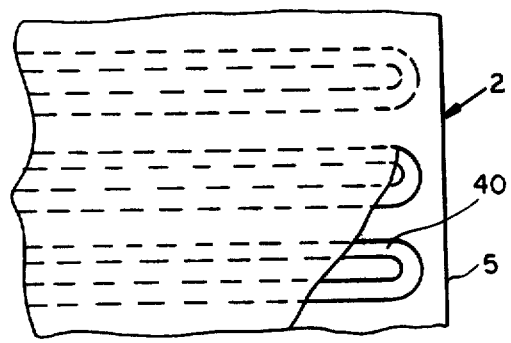
FIG. 6 is a detail view of a portion of a plate of the type used in the embodiments of FIGS. 1 and 2.

In the embodiment of FIGS. 1 and 2, each heat exchange element 2 is a planar plate which is traversed by a heat carrier, e.g. is provided with internal passages 40 in a spiral or meander configuration (see FIG. 6).

The plates are parallel to one another, horizontal and coextensive so that they have free edges 5 lying outwardly of the supports which can define the inlets 4 at the side of the grid turned toward the wind direction and outlets at the opposite side of the grid.

Communication with the passages 40 in the plates is effected by pipes and distributors not shown and of any conventional form, e.g. risers, which can communicate with the plates at the centers thereof and lend static and dynamic stability to the assembly against wind forces.

Figure 9:
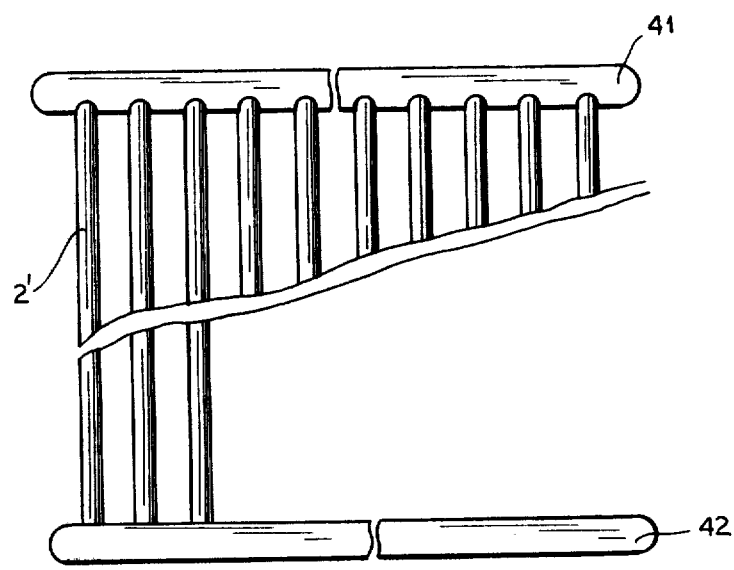
FIG. 9 is a fragmentary plan view illustrating another embodiment of the invention.

In the embodiment of FIG. 3, the heat exchange elements 2' are formed as horizontally oriented arrays of pipes which may be connected with manifolds 41 and 42 (FIG. 9) with the arrays of pipes being vertically spaced apart and staggered from one array to the next as shown in FIG. 3. Thus the pipes of alternate arrays lie in common vertical planes.

The heat exchanger 1 can have any desired heat-abstraction capacity by varying the number and size of the individual heat exchanger elements 2 to the requirements of the heat pump.

The individual elements are spaced apart by spacing sleeves 8 and are connected together by bolts 7 extending through the plates and spacers as shown in FIG. 1.

The heat exchanger elements can be provided with ribs or other means for increasing the heat exchange surface.

Figure 8:
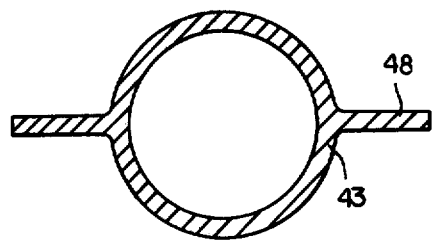
FIG. 8 is a cross section taken along the line VIII—VIII of FIG. 7.
Figure 7:
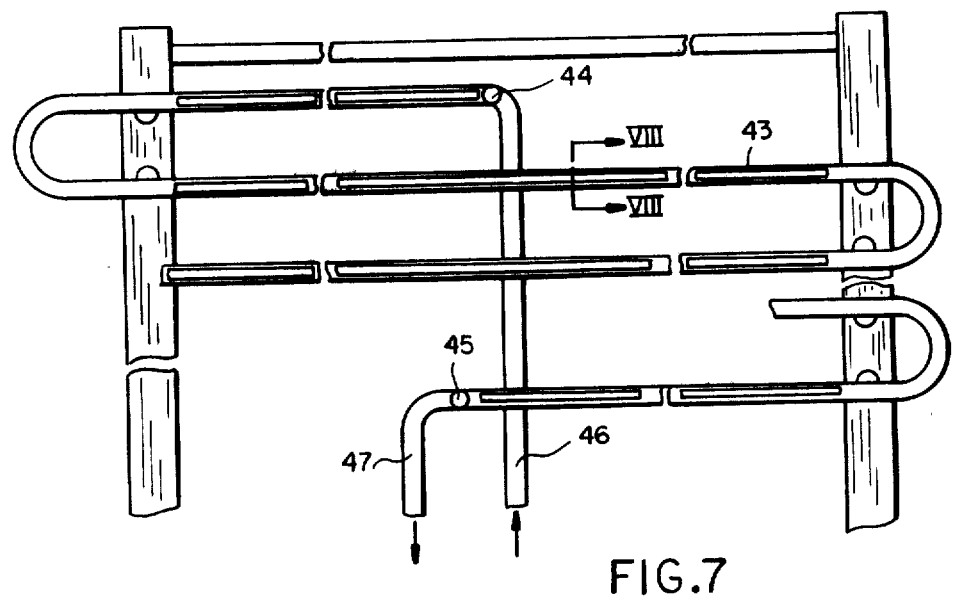
FIG. 7 is an elevational view showing one vertical layer of tubing in another heat exchanger in accordance with the invention.

The heat exchanger can also be arranged so that the heat transfer medium is not displaced in a horizontal direction but rather passes through tube bundles which can lie in a vertical plane as for the tubes 43 of FIG. 7. The tubes 43 can be connected to other tubes of the bundle via transverse pipes 44 and 45 and are connected to the heat pump by the riser 46 and the downcomer 47. The tubes may have fins 48 as shown in FIG. 8. These horizontal fins or ribs increase the heat exchange surface and preferably lie in horizontal planes. Other tube bundle constructions as described can also be used. The spacing of the heat exchange elements should be such that free passage of wind-blown air is possible even if the surfaces ice up. Removal of moisture from the heat exchange can be effected simply by turning off the heat pump and allowing natural heat exchange with the air. The heat exchange elements are preferably composed of metal but may also be composed of a synthetic resin.

In FIGS. 1 and 3 the means for mounting the flow grids 1 and 1' upon the roof 50 of the structure heated by the heat pump is represented at 51 and can comprise a pedestal to which the bolts 7 are affixed.

We claim:

1. A building-interior heating system comprising a heat pump connected to heat the interior of a building and having a heat pump fluid for the transfer of heat and a static heat exchanger traversed by said fluid, said heat exchanger comprising a multiplicity of geometrically similar, planar, vertically spaced, horizontal heat exchange elements traversed by said fluid, means for connecting said elements together in a parallelopipedal stack with vertical sides at all of which gaps between the vertically spaced elements open freely onto wind-blown air, and means for mounting said stack externally of said building for uniform through-flow of wind-blown air from any compass direction freely through said sides of said stack wherein said elements are plates being free at said sides and secured in said stack by traction bolts and spacers, said heat exchanger being devoid of any air propelling fan means and relying entirely upon wind-blown air.

2. The building-interior heating system defined in claim 1 wherein said plates are equidistant from one another in said stack.

3. The building-interior heating system defined in claim 1 wherein said elements are each formed by a multiplicity of mutually parallel tubes.

* * * * *